United States Patent Office 2,763,116
Patented Sept. 18, 1956

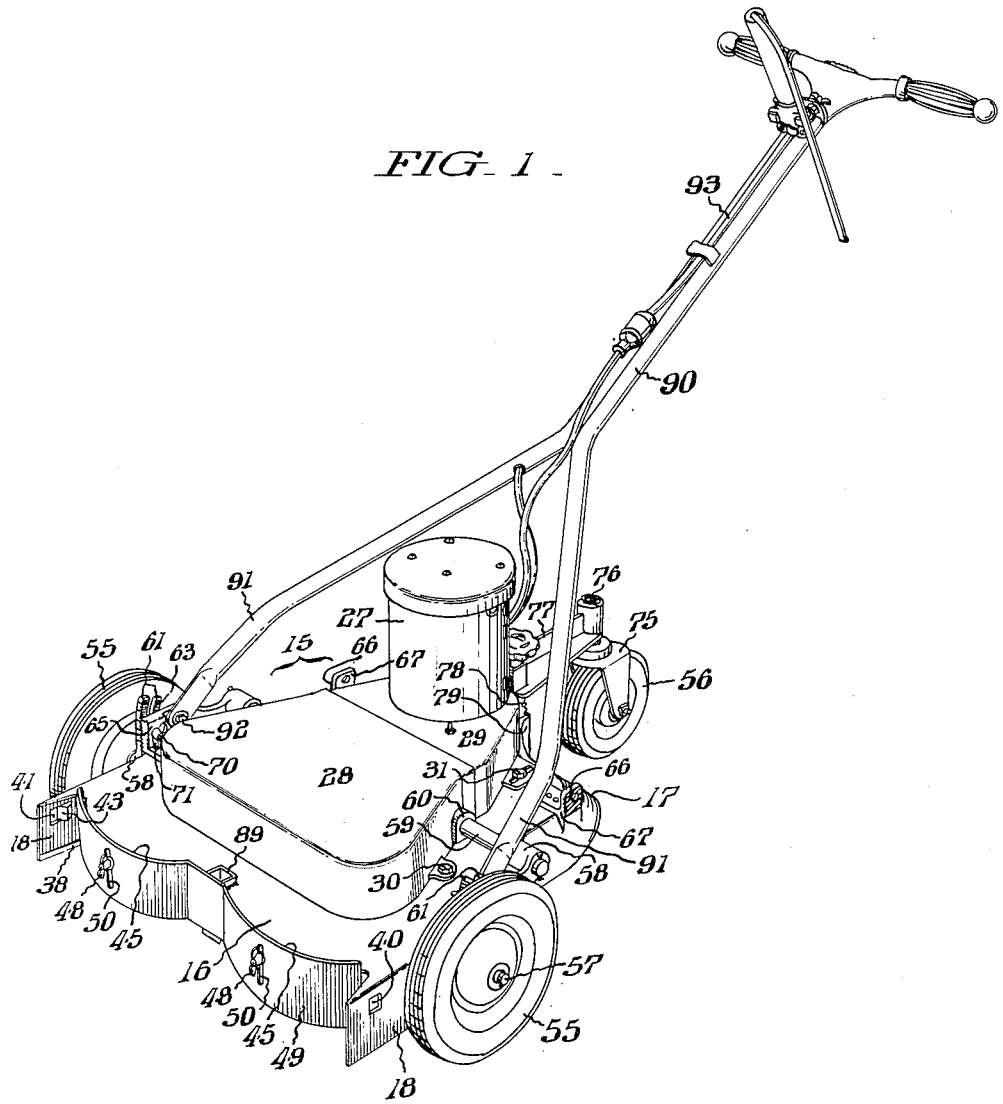

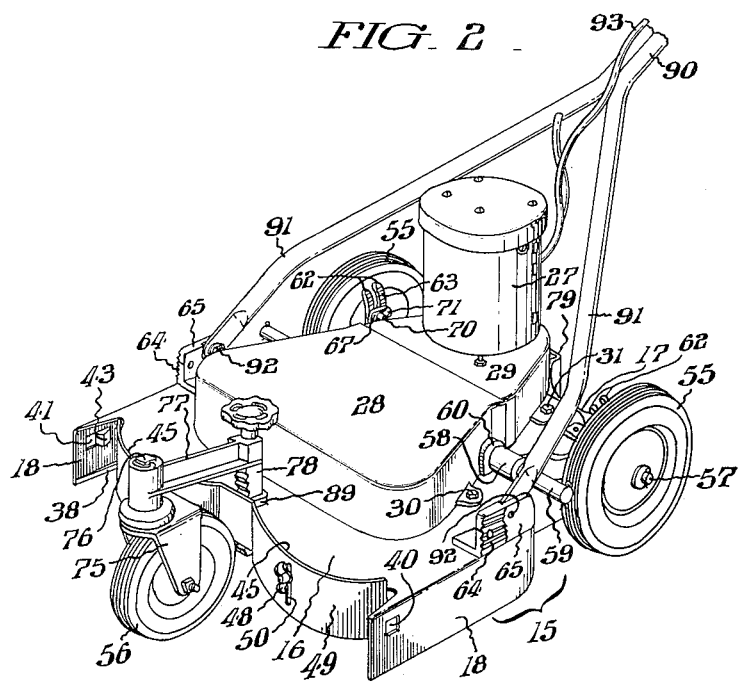

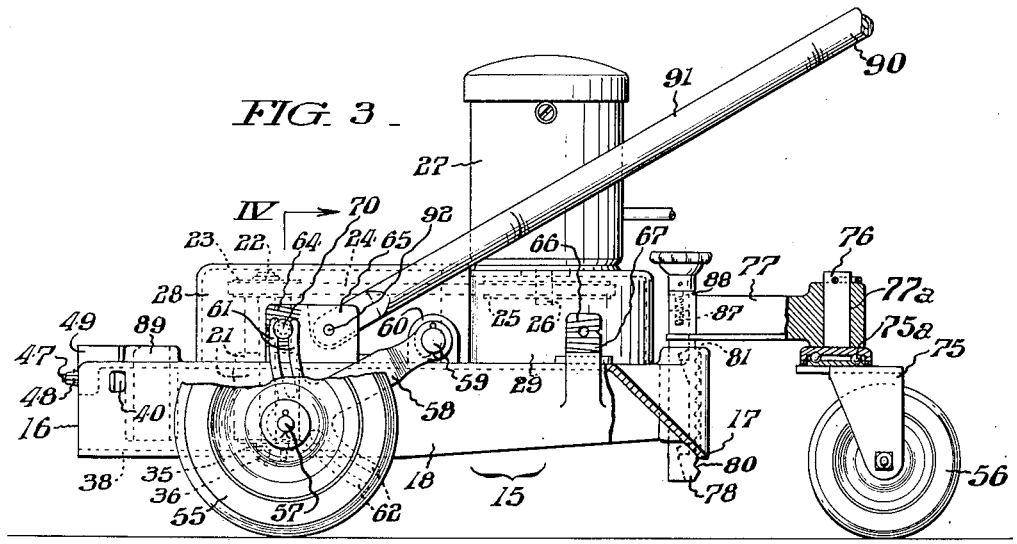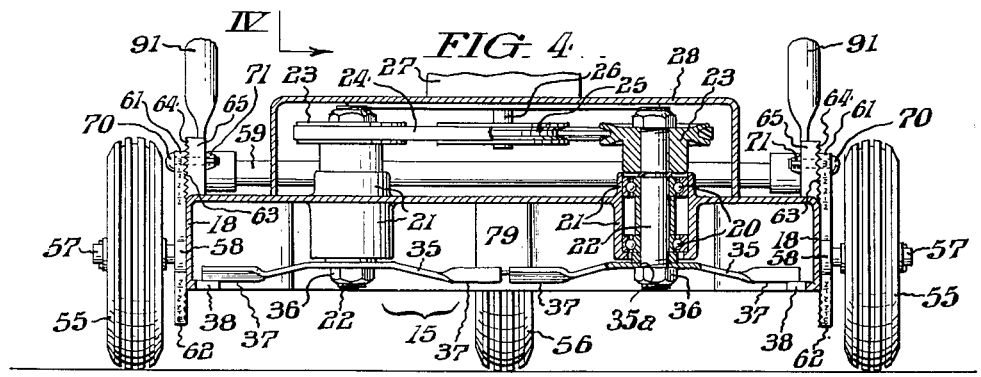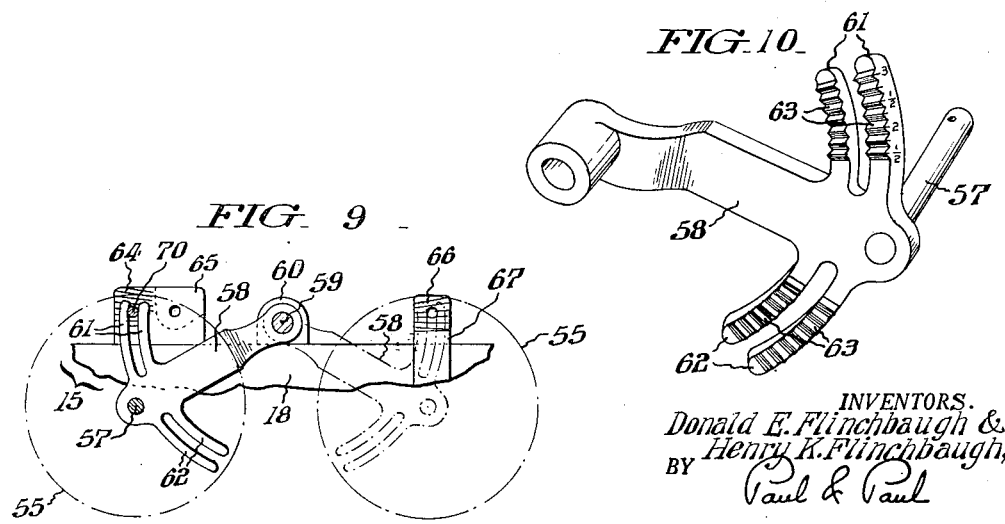

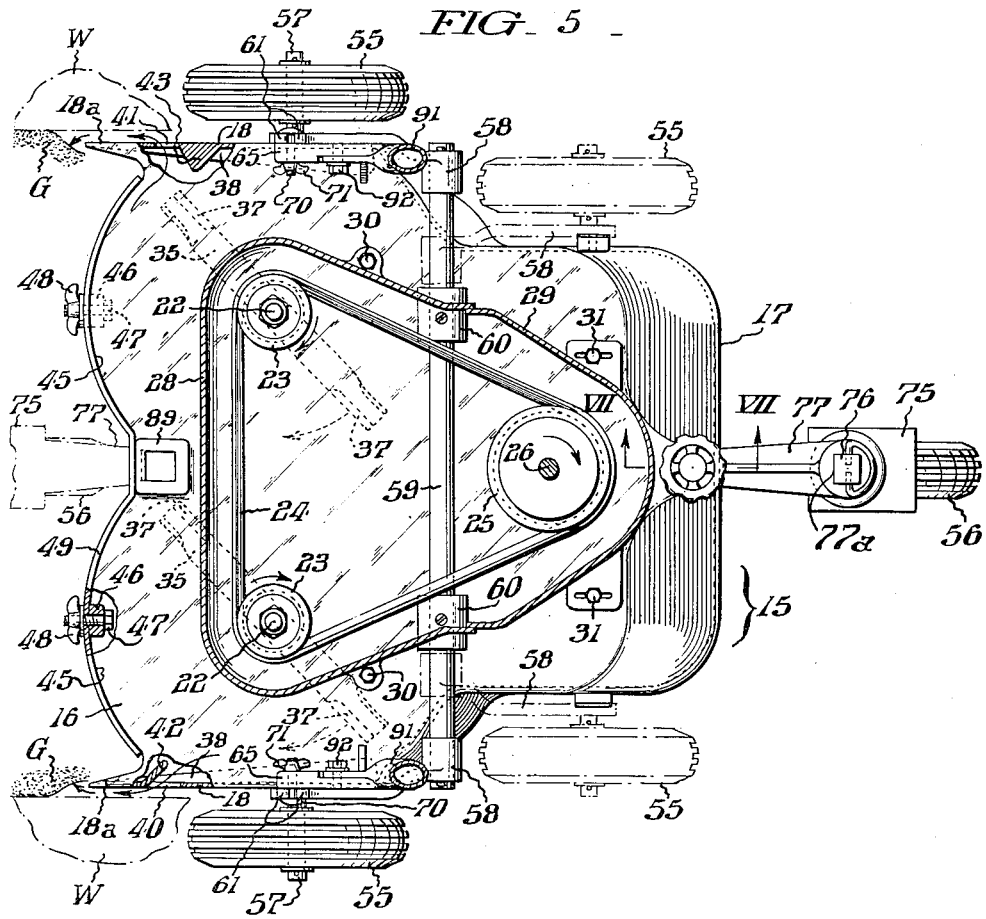
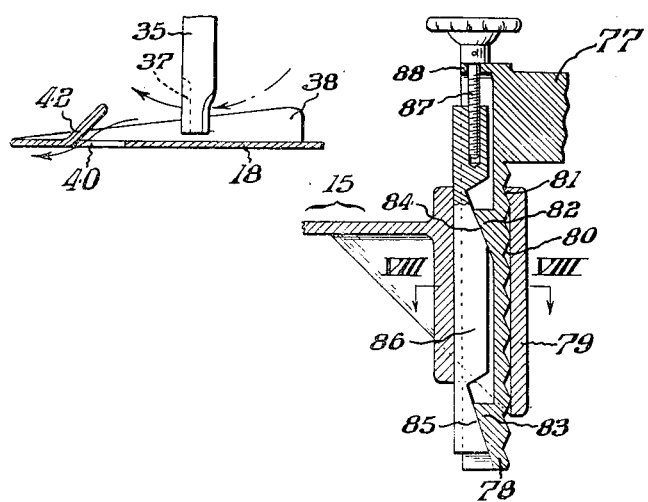
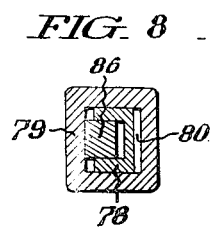

2,763,116

WHEEL MOUNTING FOR LAWN MOWER

Donald E. Flinchbaugh and Henry K. Flinchbaugh, York, Pa.

Application August 4, 1954, Serial No. 447,706

7 Claims. (Cl. 56—25.4)

This invention relates to lawn mowers. More specifically, it has reference to lawn mowers of the so called "rotary" type having cutter blades which revolve about vertical axes. Mowers of the kind particularly referred to are ordinarily provided with supporting wheels respectively at opposite sides of the cutter housings, and with a swivel steering wheel centrally of the rear. As a consequence of this usual disposal of the side wheels, the mowers could not be used for cutting close to walls or to the edges of flower beds.

One of the aims of our invention is to overcome the above mentioned drawback. This objective is realized, as hereinafter more fully disclosed, through provision of a housing which has a relatively wide frontal portion, wherein the cutters are enclosed, and a narrower rear portion; through provision of means whereby the side wheels can be transposed from their usual locations, to the sides of the rear portion of the housing so as to be wholly within the lateral confines of said frontal portions; and through the further provision of facilities whereby the steering wheel can be transferred from its usual position at the back of the mower to the front thereof at the center when the side wheels are transposed as aforesaid.

Another aim of our invention is to provide improved facilities whereby both the side wheels and the steering wheels can be adjusted up and down individually to vary the operative level of the cutters.

In connection with a lawn mower having the foregoing attributes, it is still another aim of our invention to provide improved deflecting means for gathering the grass into the range of the cutters.

Still another object of our invention to secure the above advantages in a mower which is light in weight; which is easily maneuvered; which requires a minimum of power for its operation; which is of simple and rugged construction; and which, withal, lends itself to economic manufacture in quantity at relatively small cost.

Other objects and attendant advantages will appear from the following detailed description of the attached drawings, wherein:

Fig. 1 is a perspective view of a lawn mower conveniently embodying our invention and showing the same arranged for normal use.

Fig. 2 is a view of the mower like Fig. 1, but with the side and steering wheels transposed to enable cutting close to walls or to the edges of flower beds.

Fig. 3 shows the mower in side elevation, with portions broken away and others in section.

Fig. 4 is a transverse section of the mower taken as indicated by the angled arrows IV—IV in Fig. 3.

Fig. 5 shows the mower in top plan with portions of its housing in horizontal section and others broken out to expose important details of construction which otherwise would be hidden.

Fig. 6 is a detailed view in horizontal section drawn to a larger scale and showing part of the means provided for deflecting the grass into the range of the cutters.

Fig. 7 is a fragmentary detail sectional view taken as indicated by the angled arrows VII—VII in Fig. 5.

Fig. 8 is a detail cross section taken as indicated by the angled arrows VIII—VIII in Fig. 7.

Fig. 9 is a fragmentary view showing the means by which the side wheels are transferred from one position of use to another; and Fig. 10 is a perspective view of one of the elements shown in Fig. 9.

As herein exemplified, our improved law mower comprises a main flat-topped housing component 15 which is open at the bottom, the same having a relatively wide frontal portion 16, a narrower rear portion 17, and a pendent wall 18 which extends thereabout except at the front. Rotatively supported in ball bearings, such as indicated at 20, set into laterally-spaced bosses 21 on the top of the front portion 16 of the main housing component 15, are two vertical shafts 22 whereto are secured, at the upper ends, grooved pulleys 23 respectively which, through a belt 24, are driven in unison and at the same speed from a similar pulley 25 on the shaft 26 of a vertically arranged electric motor 27. The drive connections just described are enclosed in a supplemental housing component composed of two sections 28 and 29 which are separately secured to the top of the main housing component 15 by cap screws respectively designated 30 and 31, the motor 27 being directly supported upon the section 29 with its shaft extending down through a clearance aperture in the top of said section. By virtue of this construction it will be seen that the belt 24 is accessible for replacement, when worn, by removal of the cover section 28 without necessitating removal of the motor supporting section 29.

To the lower ends of the shafts 22 are affixed cutter blades 35 which, respectively, are fashioned from flat bar metal and provided with central apertures as instanced at 35a in Fig. 4, to engage over the threaded lower ends of said shafts preparatory to the application of the securing nuts designated 36. As shown, the end portions of the respective cutter bars 35 are oppositely twisted to an angle of approximately 45% and ground as at 37 in Fig. 6 to provide sharp cutting edges. It is to be particularly noted from Fig. 4 that the cutter blades 35 pass each other with just sufficient clearance to avoid interference, and that their tips overreach inwardly projecting horizontal grass-deflecting ribs 38 on the straight pendent side wall portions 18 of the main housing component 15, said ribs being wide at the rear and tapering forwardly to vanishing points at the front edges of said side wall portions as best seen in Figs. 5 and 6. As further shown in Fig. 5 and also in Figs. 1 and 2, the side wall portions 18 of the main frame component 15 are provided, adjacent their front ends, with quadrangular apertures 40 and 41 respectively, and with inwardly sloped deflecting lugs 42 and 43 forwardly and rearwardly respectively of said apertures. The front edge of the top of the main housing component 15 has portions which are curved concentrically, as at 45, with the centers of the cutter shafts 22; and pendent centrally from said edge portions are anchorage lugs 46 (Fig. 5) for screw bolts 47, with associated wing nuts 48 by means of which a conformative guard 49 is secured in place. For the purposes of vertical adjustment, the guard 49 is provided, as best shown in Figs. 1 and 2, with clearance slots 50 for the screw bolts 47. It is to be noted that the side walls 18 of the main housing are extended forwardly as at 18a in Fig. 5 to serve as scoops to gather the grass into the range of the cutting blades 35, as later on more fully explained, during advance of the mower over the lawn.

In accordance with our invention, the mower is equipped with two main side wheels 55 and a somewhat smaller swivel or steering wheel 56, all of said wheels preferably having rubber tires. As shown, the side wheels 55 are mounted on stub axles 57 projecting laterally from the distal ends of lever arms 58 which are fulcrumed respectively about the opposite ends of a transverse shaft 59 fixedly secured in upstanding ears 60 at the top of the main housing component 15 medially of its length. The lever arms 58, one of which is separately illustrated in perspective in Fig. 10, have symmetrically-disposed arcuate bifurcations 61 and 62 of which the inner faces are corrugated, at at 63, for selective interengagement with corresponding corrugations 64, as in Figs. 3 and 4, with transversely-aligned lugs 65 at the sides of the front portion 16 of the main housing component 15, or with similar corrugations 66 of transversely-aligned lugs 67 upstanding from the sides of the rear portion of said main housing component in adapting the mower to different operating conditions as later on explained, said lugs 65 and 67 being equally spaced from the shaft 59. In one case, the lever arms 58 are secured in adjusted positions by headed bolts 70 with associated wing nuts 71, the shanks of said bolts being passed through holes in the respective lugs 65 and through the bifurcations 61 of said arms as in Figs. 1, 3 and 4. In the other case, the bolts 70 are transferred to holes in the supplemental lugs 67 and their shanks passed through the bifurcations 62 of the lever arms 58 as shown in Fig. 2 and as instanced in broken lines in Fig. 9.

The swivel mounting 75 (Fig. 3) for the steering wheel 56 includes a ball bearing 75a and the square stud 76 thereof is engaged in a square hole 77a in one end of an arm 77 which, at the other end, see Figs. 7 and 8, has a pendent shank 78 which is channel shaped in cross section and adapted to engage downwardly into a square section socket lug 79 centrally of the rear of the main housing component 15. The rear face of the shank 78 of the arm 77 is corrugated, as at 80, for selective engagement with a single opposing corrugation 81 on the confronting face of the socket hole in the lug 79; and the channel hollow of said shank has within it a pair of vertically-spaced wedge cam projections 82, 83 to cooperate with opposing cam surfaces 84 and 85 on a slide bar 86 disposed in said channel hollow. The slide bar 86 is adjustable endwise, i. e. up and down, by means of a regulating hand screw 87 which is loosely engaged in a projection 88 at the top of the shank 78 of the arm 77. By turning the screw 87 in one direction, the slide bar 86 will be raised and the corrugations 80 on the shank 78 of the arm 77 will be forced into gripping engagement with the projection 81 in the socket lug 70 as wedging action takes place between the sloped surfaces 82, 84 and 83, 85. By turning the screw 87 in the opposite direction, the slide bar 86 will be depressed and the shank 78 on the arm 77 of the steering wheel swivel released for withdrawal from the socket lug 79.

The main housing component is also provided centrally of its front end with a socket lug 89, similar to the socket lug 79, to which the steering wheel mounting can be transferred as shown in Fig. 2.

The mower is maneuverable by means of a handle bar 90 whereof the yoke extremities 91 are connected, by pivot bolts 92, to the lugs 65. Suitably attached to the handle bar 90 is a conductor 93 through which electric current is supplied to the motor 27. As the mower is travelled over the turf, the grass is gathered in by the projecting ends 18a of the side wall portions 18 and deflected into the range of the cutters 35 by the ribs 38. This action is enhanced by swirling air currents set up by the rapidly rotating cutters. With the side wheels 55 and the steering wheel 56 arranged as in Fig. 2, it will be seen that the mower can be used to trim grass close to walls or along the edges of flower beds, clean and effective trimming being assured since the cutters encounter the grass before the side wheels roll over it. When the mower is used to trim grass along walls W as shown in broken lines in Fig. 5, air currents set up by rapid rotation of the blades 35 within the housing 15 are deflected outwardly by the lugs 42 and 43 through the apertures 41 and 42 as indicated by the arrows. As these deflected air currents strike the walls W, they are deflected, in turn, away from the latter and thereby displace the grass G immediately adjacent the walls and ahead of the mower into the path of the scoop projections for deflection into the range of the cutting blades 35. In this way, clean trimming of grass along walls is assured as will be readily understood from Fig. 5.

Having thus described our invention, we claim:

1. In a lawn mower, a hollow open bottom housing with a wide frontal portion and a narrower rear portion; a pair of cutters rotated about transversely-spaced axes within the frontal portion of the housing; a shaft extending crosswise of the housing substantially midway of the length of the latter; traction wheels carried at the distal ends of arms loosely fulcrumed respectively upon opposite ends of the shaft for capacity to be swung forwardly or rearwardly about the shaft; means for releasably securing the arms, when swung forwardly, to opposite sides of the wide portion of the housing with the wheels beyond, and for releasably securing the arms when swung rearwardly and shifted inwardly of the shaft ends, to opposite sides of the narrow portion of the housing with the wheels disposed inwardly of the sides of wide portions of the housing; vertical axis sockets centrally of opposite ends of the housing; and a swivelled steering wheel mounting with a stud selectively engageable into the front and rear sockets of the housing.

2. A lawn mower according to claim 1, wherein the arms adjacent their distal ends are provided with symmetrically disposed slotted arcuate projections concentric with the fulcrum axes of said arms; wherein the housing is provided at opposite sides of its wide and narrow portions respectively with transversely-aligned upstanding lugs; and wherein the securing means comprises headed screw bolts whereof the shanks are passed through one of the slotted projections of the respective arms, when the latter are swung forwardly, and threadedly engaged into the lugs on the wide portion of the housing and, when the arms are swung rearwardly, the shanks of the bolts are passed through the other arcuate projections of the respective arms and threadedly engaged in the bosses on the narrower portion of the housing.

3. A lawn mower according to claim 2, wherein the opposing faces of the slotted projections of the arms and the lugs on the wide and narrow portions of the housing are corrugated to prevent displacement of said arms in different positions of adjustment.

4. A lawn mower according to claim 1, wherein the stud of the steering wheel mounting has a lose fit in the sockets at the front and rear ends of the housing; and wherein the securing means therefor comprises a bar which is engageable in the sockets behind the shank of the steering wheel mounting, and an actuating screw for drawing the bar endwise for cooperatin of a wedge surface thereon with an opposing wedge surface on said shank.

5. A lawn mower according to claim 4, wherein the shank of the steering wheel mounting has a corrugated face adapted to be engaged by projections within the socket holes to insure maintenance of the steering wheel in selected positions of vertical adjustment.

6. A lawn mower according to claim 1, wherein portions of the top wall of the housing extend beyond the cutters and terminate in edges concentric with the cutter axes, further including a conformative vertically-adjustable guard plate with vertical slots therein; and screw bolts of which the shanks are passed through the slots of the guard and threadedly engage into lugs on the top wall of the housing to secure the guard plate in the position to which it is adjusted.

7. A lawn mower according to claim 1, further including drive means for rotating the cutter blades in opposite directions; scooping projections extending forwardly respectively from the side walls of the housing at the front; apertures respectively in the side walls of the housing in the plane of the cutters rearwardly of the scoop projections; and lugs at the inner faces of the side walls of the housing forwardly and rearwardly of the respective apertures, said lugs having inclined faces for deflecting grass blades gathered in by the scoop projections incident to forward travel of the mower into the range of the cutters.

References Cited in the file of this patent

UNITED STATES PATENTS

| | | |
|---|---|---|
| 1,310,056 | Fairman | Dec. 26, 1916 |
| 1,560,802 | Julstedt | Nov. 10, 1925 |
| 2,245,821 | Poynter | June 17, 1941 |
| 2,312,972 | Orr | Mar. 2, 1943 |
| 2,523,439 | May | Sept. 26, 1950 |
| 2,577,938 | Walte | Dec. 11, 1951 |